United States Patent
Miya et al.

(10) Patent No.: US 7,466,051 B2
(45) Date of Patent: Dec. 16, 2008

(54) SUPERCONDUCTING MAGNETIC BEARING

(75) Inventors: Kenzo Miya, Tokyo (JP); Kazuyuki Demachi, 91-304, Shirakata, Tokai-mura, Naka-gun, Ibaraki (JP); Hironori Kameno, Nara (JP); Ryouchi Takahata, Nara (JP)

(73) Assignees: Kazuyuki Demachi, Ibaraki (JP); JTEKT Corporation, Osaka (JP)

( * ) Notice: Subject to any disclaimer, the term of this patent is extended or adjusted under 35 U.S.C. 154(b) by 0 days.

(21) Appl. No.: 10/523,030

(22) PCT Filed: Aug. 2, 2002

(86) PCT No.: PCT/JP02/07911

§ 371 (c)(1), (2), (4) Date: Sep. 26, 2005

(87) PCT Pub. No.: WO2004/013504

PCT Pub. Date: Feb. 12, 2004

(65) Prior Publication Data

US 2006/0103249 A1    May 18, 2006

(51) Int. Cl.
*H02K 7/09*        (2006.01)
*H02K 1/00*        (2006.01)
(52) U.S. Cl. ............. 310/90.5; 310/156.08; 310/156.12
(58) Field of Classification Search ................ 310/90.5, 310/156.08, 156.12
See application file for complete search history.

(56) References Cited

U.S. PATENT DOCUMENTS

| | | | | |
|---|---|---|---|---|
| 4,327,349 A | * | 4/1982 | Ettinger et al. | 336/219 |
| 5,159,219 A | * | 10/1992 | Chu et al. | 310/90.5 |
| 5,177,387 A | * | 1/1993 | McMichael et al. | 310/90.5 |
| 5,438,038 A | * | 8/1995 | Takahata et al. | 310/90.5 |
| 5,479,059 A | * | 12/1995 | Weinberger | 310/90.5 |
| 5,525,849 A | * | 6/1996 | Ito et al. | 310/90.5 |
| 5,747,426 A | * | 5/1998 | Abboud | 505/166 |
| 5,763,971 A | * | 6/1998 | Takahata et al. | 310/90.5 |
| 6,093,984 A | * | 7/2000 | Shiga et al. | 310/26 |
| 6,179,773 B1 | * | 1/2001 | Prem et al. | 600/17 |
| 6,223,512 B1 | * | 5/2001 | Koltze et al. | 57/67 |

(Continued)

FOREIGN PATENT DOCUMENTS

JP        60028759 A    *    2/1985

(Continued)

OTHER PUBLICATIONS

Note: JP04079741 was provided in First Office Action.*

(Continued)

*Primary Examiner*—Tran Nguyen
(74) *Attorney, Agent, or Firm*—Oblon, Spivak, McClelland, Maier & Neustadt, P.C.

(57) ABSTRACT

A superconductive magnetic bearing 22 comprises a stationary bearing portion 23 having an annular superconductor unit 26 provided on a fixed portion 20, and a rotatable bearing portion 24 having annular permanent magnet units 28, 29 provided on a rotary portion 21 so as to be opposed to the superconductor unit 26. The rotary portion 21 is contactlessly supported relative to the fixed portion 20 by the pinning effect of a superconductor constituting the superconductor unit 26. The permanent magnet units 28, 29 each comprise a plurality of permanent magnet members arranged in superposed layers with an insulating layer provided between each adjacent pair of magnet members.

1 Claim, 8 Drawing Sheetse

U.S. PATENT DOCUMENTS

| | | | |
|---|---|---|---|
| 6,259,179 B1 * | 7/2001 | Fukuyama et al. | 310/90.5 |
| 6,369,476 B1 * | 4/2002 | Sung et al. | 310/90.5 |
| 6,483,222 B2 * | 11/2002 | Pelrine et al. | 310/268 |
| 6,541,885 B2 * | 4/2003 | Canders et al. | 310/90.5 |
| 6,762,522 B2 * | 7/2004 | Steinmeyer | 310/90.5 |
| 7,002,273 B2 * | 2/2006 | Schippl | 310/90.5 |
| 2003/0104246 A1 * | 6/2003 | Watanabe et al. | 428/692 |
| 2004/0021382 A1 * | 2/2004 | Steinmeyer | 310/90.5 |
| 2005/0116565 A1 * | 6/2005 | Schippl | 310/90.5 |

FOREIGN PATENT DOCUMENTS

| | | | |
|---|---|---|---|
| JP | 61170267 A | * | 7/1986 |
| JP | 04079741 A | * | 3/1992 |
| JP | 4-285316 | | 10/1992 |
| JP | 2001-20950 | | 1/2001 |

OTHER PUBLICATIONS

Patent Abstracts of Japan, JP 05-248436, Sep. 24, 1993.

* cited by examiner

Fig. 1

PRIOR ART

Fig. 2

PRIOR ART

SUPERCONDUCTING MAGNETIC BEARING

TECHNICAL FIELD

The present invention relates to superconductive magnetic bearings wherein a rotatable portion is contactlessly supported relative to a stationary portion utilizing the pinning effect of a superconductor of the second kind.

BACKGROUND ART

Superconductive magnetic bearings of the type mentioned and already known include those comprising a stationary bearing portion having an annular superconductor unit provided on a stationary portion, and a rotatable bearing portion having an annular permanent magnet unit provided on a rotatable portion so as to be opposed to the superconductor unit. Such superconductive magnetic bearings further include superconductive magnetic bearings of the radial type wherein the two bearing portions are opposed radially of the bearing, and those of the axial type wherein the two bearing portions are opposed axially of the bearing.

Figure 1:
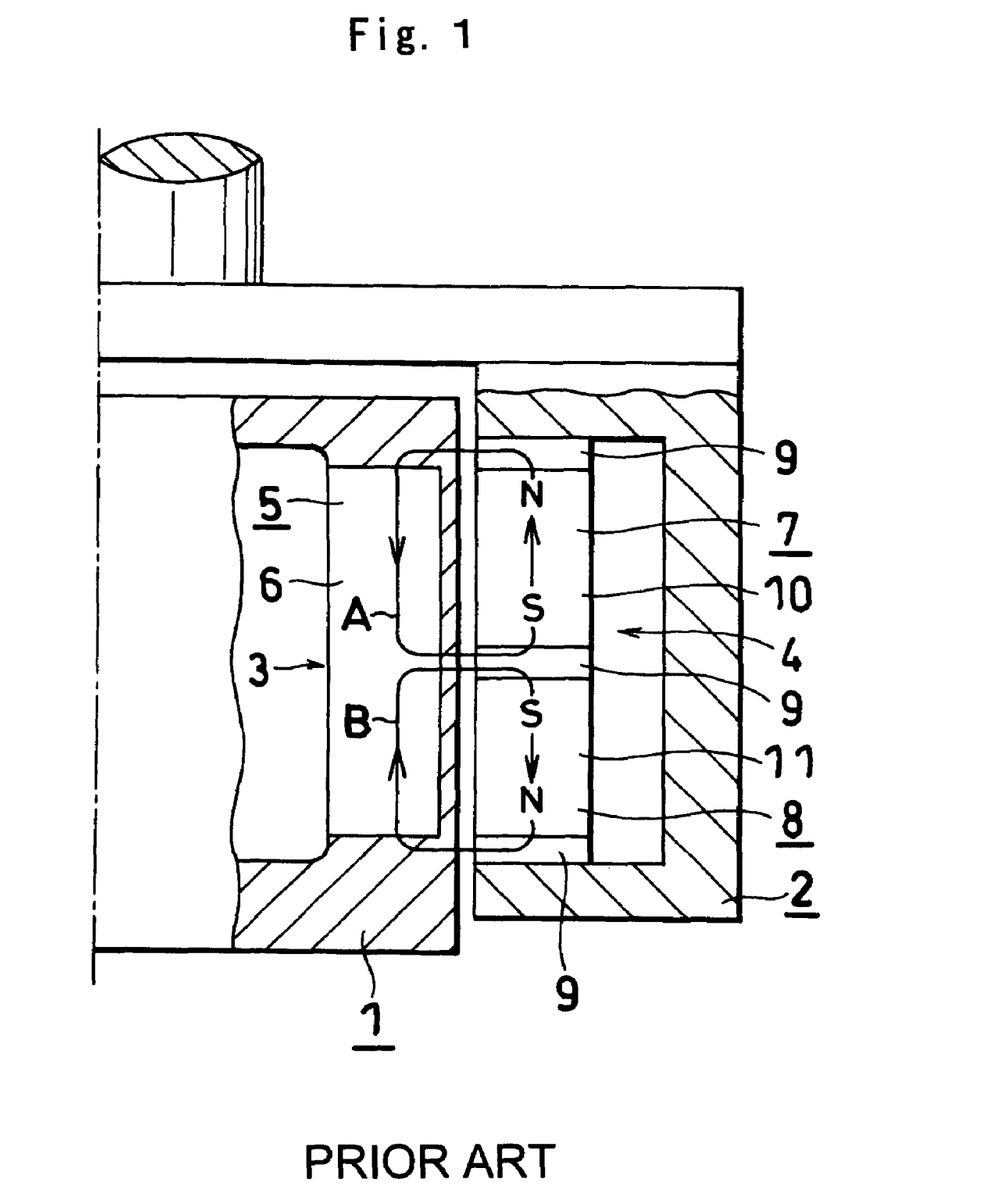
FIG. 1 is a view in vertical section schematically showing an example of conventional superconductive magnetic bearing of the radial type.

FIG. 1 shows an example of conventional superconductive magnetic bearing of the radial type.

With reference to FIG. 1, indicated at 1 is a stationary portion in the form of a shaft, and at 2 a rotatable portion in the form of a hollow cylinder and rotatable around the stationary portion 1. The stationary portion 1 is provided with a stationary bearing portion 3, and the rotatable portion 2 with a rotatable bearing portion 4.

Figure 2:
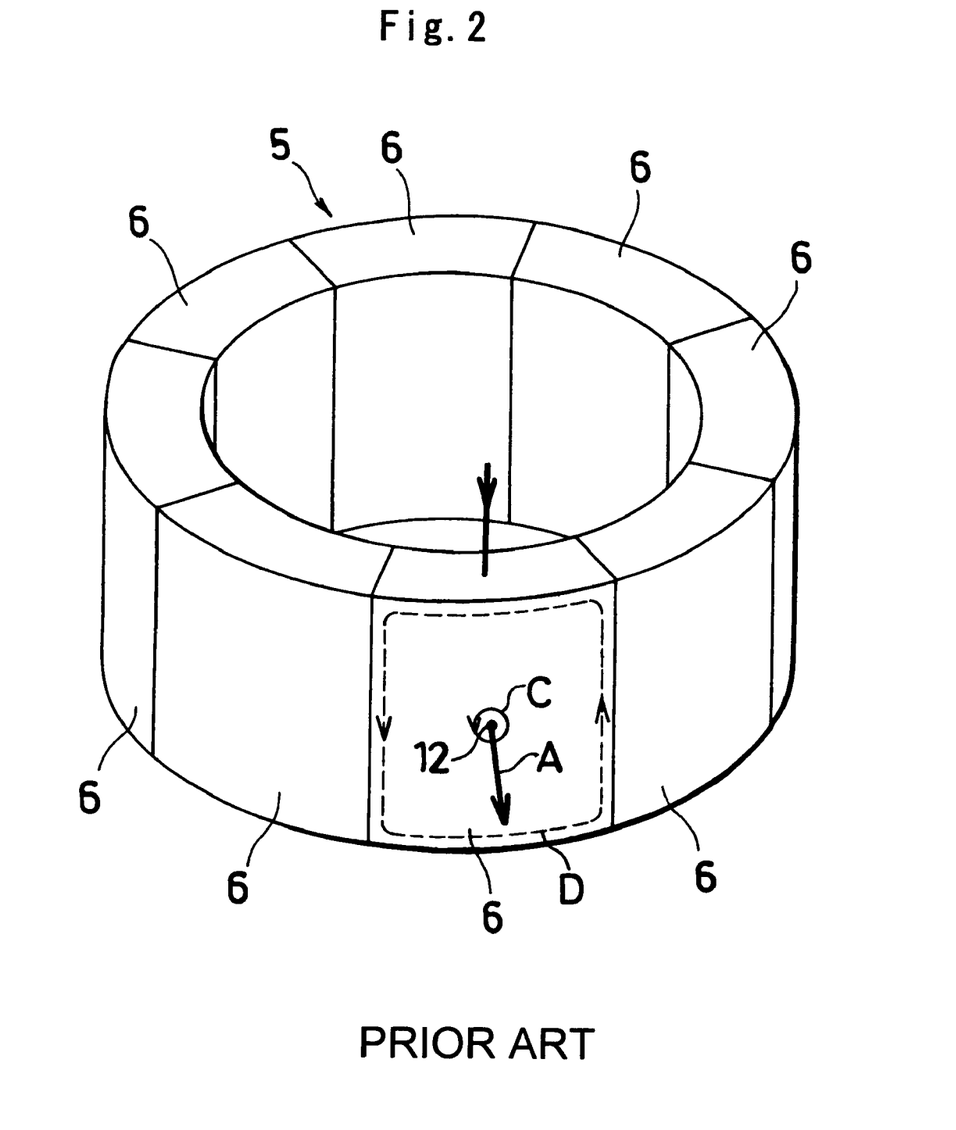
FIG. 2 is a perspective view showing the portion of a superconductor unit in FIG. 1.

The stationary bearing portion 3 has a superconductor unit 5 in the form of a hollow cylinder. As shown in FIG. 2, the superconductor unit 5 comprises a plurality of superconductor bulks 6 in the form of circumferentially divided segments of a hollow cylinder. Each of the superconductor bulks 6 comprises a superconductor of the second kind having fine normally conductive particles uniformly incorporated therewith. The superconductor bulks 6 are cooled as with liquid nitrogen.

The rotatable bearing portion 4 has two hollow cylindrical permanent magnet units 7, 8 arranged side by side axially of the bearing, and three annular yokes 9 of magnetic material arranged between the adjacent end faces of the two magnet units 7, 8 and over the other end faces thereof. Although not shown in detail, each permanent magnet units 7 (8) comprises a plurality of permanent magnet bulks 10 (11) in the form of circumferentially divided segments of a hollow cylinder. The permanent magnet units 7, 8 each have magnetic poles at axial (upward and downward) opposite ends thereof. The adjacent ends of the two permanent magnet units 7, 8 have the same polarity. In this case, the upper unit 7 has an N pole at its upper end and an S pole at its lower end, and the lower unit 8 has an S pole at its upper end and an N pole at its lower end.

The upper permanent magnet unit 7 sets up a magnetic field indicated by an arrow A in FIG. 1 between the magnet unit 7 and the upper portion of the superconductor unit 5. Similarly, the lower permanent magnet unit 8 sets up a magnetic field indicated by an arrow B in FIG. 1 between the magnet unit 8 and the lower portion of the superconductor unit 5. When the superconductor unit 5 is brought into a superconducting state by cooling, the magnetic fields penetrating into the unit 5 are captured at (pinned to) normally conductive portions (pinning points) of the normal conductor particles in the interior of the unit 5, and the rotatable bearing portion 4 is supported by this pinning effect with respect to the axial and radial directions relative to the stationary bearing portion 3.

In the permanent magnet units 7, 8 of the superconductive magnetic bearing described above, the permanent magnet bulks 10, 11 are circumferentially uniform in magnetic field, but the boundaries between adjacent magnet bulks 10, 11 are not uniform in magnetic field. The yokes 9 are used to diminish such circumferential unevenness of magnetic fields, and the presence of the yokes 9 enables the permanent magnet units 7, 8 to set up substantially uniform magnetic fields. Accordingly, the magnetic fields remain unaltered to produce no resistance to rotation despite the rotation of the magnet units 7, 8 with the rotatable portion 2. The circumferentially uniform magnetic fields are captured at the pinning points of the superconductor unit 5 as described above.

On the other hand, the superconductor unit 5 has the problem that since the unit 5 is divided into a plurality of superconductor bulks 6 as arranged circumferentially thereof, the magnetic fields set up by the unit 5 are uneven with respect to the circumferential direction.

A description will be given of the superconductor bulks 6 wherein the magnetic fields provided by the permanent magnet units 7, 8 are captured. As shown in FIG. 2, the magnetic field is captured at a large number of pinning points 12 in each superconductor bulk 6, and a shielding current indicated by an arrow C flows around the point 12. The magnetic field set up by this shielding current becomes a magnetic field captured by the bulk 6. Inside the bulk 6, the pinning points 12 are uniformly distributed with respect to the circumferential direction, so that the magnetic fields captured are uniform. At the portion of boundary between adjacent superconductor bulks 6, the distribution of pinning points 12 is uneven, and the magnetic fields are also uneven. When this is observed macroscopically, the shielding currents around the pinning points 12 which are uniformly distributed offset one another, whereas at the boundary between superconductor bulks 6, the shielding currents around the outermost pinning points 12 are not offset, with the result that when the bulk 6 is observed in its entirety, a shielding current flows as indicated in a broken line D in FIG. 2. Since such shielding current flows through every bulk 6, the superconductor unit 5 becomes uneven in magnetic field with respect to the circumferential direction. If the magnetic fields set up by the unit 5 become circumferentially uneven, the permanent magnet units 7, 8 are subjected to varying magnetic fields when rotating with the rotatable portion 2, producing eddy currents in the units 7, 8 and giving rise to a rotation loss, Eddy currents also occur in the yokes 9 owing to the circumferential unevenness of magnetic fields in the superconductor unit 5.

An object of the present invention is to overcome the above problem and to provide a superconductive magnetic bearing which is diminished in the eddy currents occurring in the permanent magnet units and in the yokes due to the unevenness of magnetic fields set up by the superconductor unit to ensure a reduced rotation loss.

DISCLOSURE OF THE INVENTION

The present invention provides a superconductive magnetic bearing comprising a stationary bearing portion having an annular superconductor unit provided on a fixed portion, and a rotatable bearing portion having an annular permanent magnet unit provided on a rotary portion so as to be opposed to the superconductor unit, the rotary portion being contactlessly supported relative to the fixed portion by the pinning effect of a superconductor constituting the superconductor unit, the superconductive magnetic bearing being characterized in that the permanent magnet unit comprises a plurality of permanent magnet members arranged in superposed layers with an insulating layer provided between each adjacent pair of magnet members.

The permanent magnet members are arranged in superposed layers in at least one of the axial direction and the radial direction.

For example, permanent magnet members each in the form of a disk having a hole are arranged in superposed layers axially of the bearing. For example, permanent magnet members each in the form of a thin hollow cylinder are arranged in superposed layers radially of the bearing. Further for example, a plurality of annular permanent magnet members each having a square or rectangular cross section are arranged in superposed layers both axially and radially of the bearing.

Each permanent magnet member may be an integral piece extending over the entire circumferential direction or may comprise a plurality of circumferentially divided circular-arc segments. Thus, the permanent magnet members are arranged in superposed layers in at least one of the axial direction, radial direction and circumferential direction.

In the case where the superconductive magnetic bearing is of the radial type wherein the stationary bearing portion and the rotatable bearing portion are opposed radially of the bearing, for example, a plurality of permanent magnet members each in the form of a disk having a hole are arranged in superposed layers axially of the bearing. Alternatively, a plurality of annular permanent magnet members are arranged in superposed layers both axially and radially of the bearing.

In the case where the superconductive magnetic bearing is of the axial type wherein the stationary bearing portion and the rotatable bearing portion are opposed axially of the bearing, for example, a plurality of permanent magnet members each in the form of a thin hollow cylinder are arranged in superposed layers radially of the bearing. Alternatively, a plurality of annular permanent magnet members are arranged in superposed layers both axially and radially of the bearing.

With the superconductive magnetic bearing of the invention, the permanent magnet unit comprises a plurality of permanent magnet members arranged in superposed layers with an insulating layer provided between each adjacent pair of magnet members, so that even when the permanent magnet unit is subjected to varying magnetic fields, the eddy currents to be produced in the magnet units diminish to ensure a reduced rotation loss.

Accordingly, the superconductive magnetic bearing of the invention can be diminished in the eddy currents to be produced in the magnet unit to reduce the rotation loss.

Preferably the superconductor unit continuously extends over the entire circumferential direction, whereas for the convenience of fabrication, the superconductor unit usually comprises a plurality of circumferentially divided superconductor bulks.

In the case where the superconductor unit comprises a plurality of circumferentially divided superconductor bulks, the magnetic fields to be set up by the superconductor units become uneven with respect to the circumferential direction, with the result that the magnetic unit is subjected to varying magnetic fields when rotating with the rotary portion. With the superconductive magnetic bearing of the present invention, however, the permanent magnet unit comprises a plurality of permanent magnet members arranged in superposed layers with an insulating layer provided between each adjacent pair of magnet members. This construction diminishes the eddy currents to be produced in the magnet unit and also reduces the rotation loss due to the eddy currents.

Thus, the construction described above diminishes the eddy currents to be produced in the permanent magnet unit due to the unevenness of the magnetic fields to be set up by the superconductor unit to reduce the rotation loss that would otherwise result.

For example, the rotatable bearing portion comprises the annular permanent magnet unit and an annular yoke adjacent to the permanent magnet unit and opposed to the superconductor unit, the yoke comprising a plurality of yoke members made of a magnetic material and arranged in superposed layers with an insulating layer interposed between each adjacent pair of yoke members.

For example, a silicon steel sheet is used as the magnetic material for the yoke members.

In the case of a superconductive magnetic bearing of the radial type, for example, yoke members each in the form of a disk having a hole are arranged in superposed layers axially of the bearing. In the case of a superconductive magnetic bearing of the axial type, for example, yoke members each in the form of a thin hollow cylinder are arranged in superposed layers radially of the bearing.

The rotatable bearing portion has at least one permanent magnet unit.

In the case where one permanent magnet unit is provided, the yoke is provided preferably at each of two locations on opposite sides of the magnet unit.

Preferably, the rotatable bearing portion has a plurality of permanent magnet units. More preferably, two permanent magnet units are provided. In the case where the rotatable bearing unit has two magnet units, the yoke is disposed preferably at three locations, i.e., between the two magnet units and on opposite sides of the magnet unit arrangement.

In the case of the superconductive magnetic bearing of the radial type, for example, two permanent magnet units are arranged axially of the bearing, and the yoke is positioned at three locations, i.e., between these magnet units and on axial opposite sides of the magnet unit arrangement.

In the case of the superconductive magnetic bearing of the axial type, for example, two permanent magnet units are arranged radially of the bearing, and the yoke is positioned at three locations, i.e., between these magnet units and on radial opposite sides of the magnet unit arrangement.

The yoke comprises yoke members as arranged in superposed layers in at least one of the axial direction and radial direction, preferably in many directions if structurally possible.

When the yokes are subjected to varying magnetic fields while rotating with the rotary portion, eddy currents are produced also on the yokes, whereas if the yokes each comprise yoke members of magnetic material as arranged in superposed layers with an insulating layer provided between each adjacent pair of yoke members, the eddy currents to be produced on the yokes diminish to reduce the rotation loss to be otherwise produced by the eddy currents.

Thus, the construction described above diminishes the eddy currents to be produced in the permanent magnet units and in the yokes due to the unevenness of the magnetic fields to be set up by the superconductor unit to reduce the rotation loss.

BEST MODE OF CARRYING OUT THE INVENTION

Two embodiments of the invention will be described below with reference to FIGS. 3 to 9.

Figure 3:
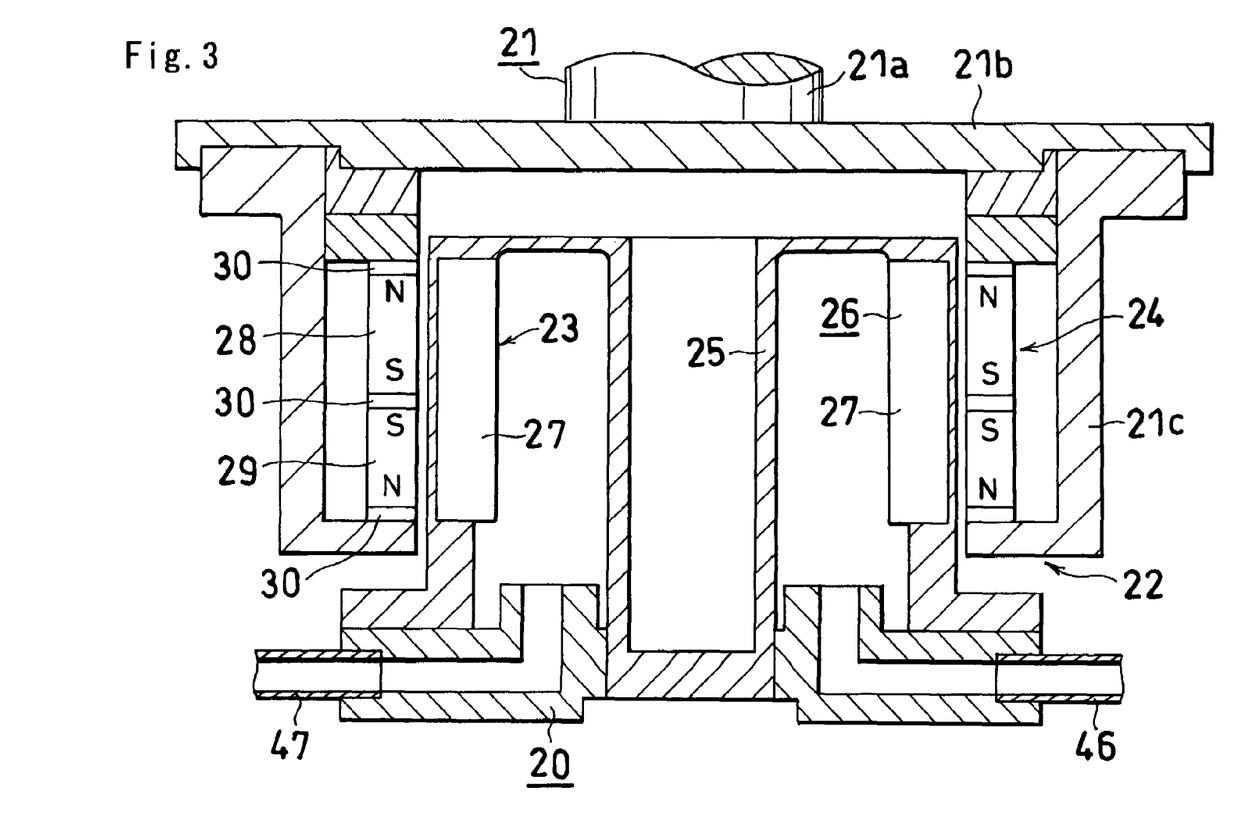
FIG. 3 is a view in vertical section of a superconductive magnetic bearing of the radial type to show a first embodiment of the invention.
Figure 4:
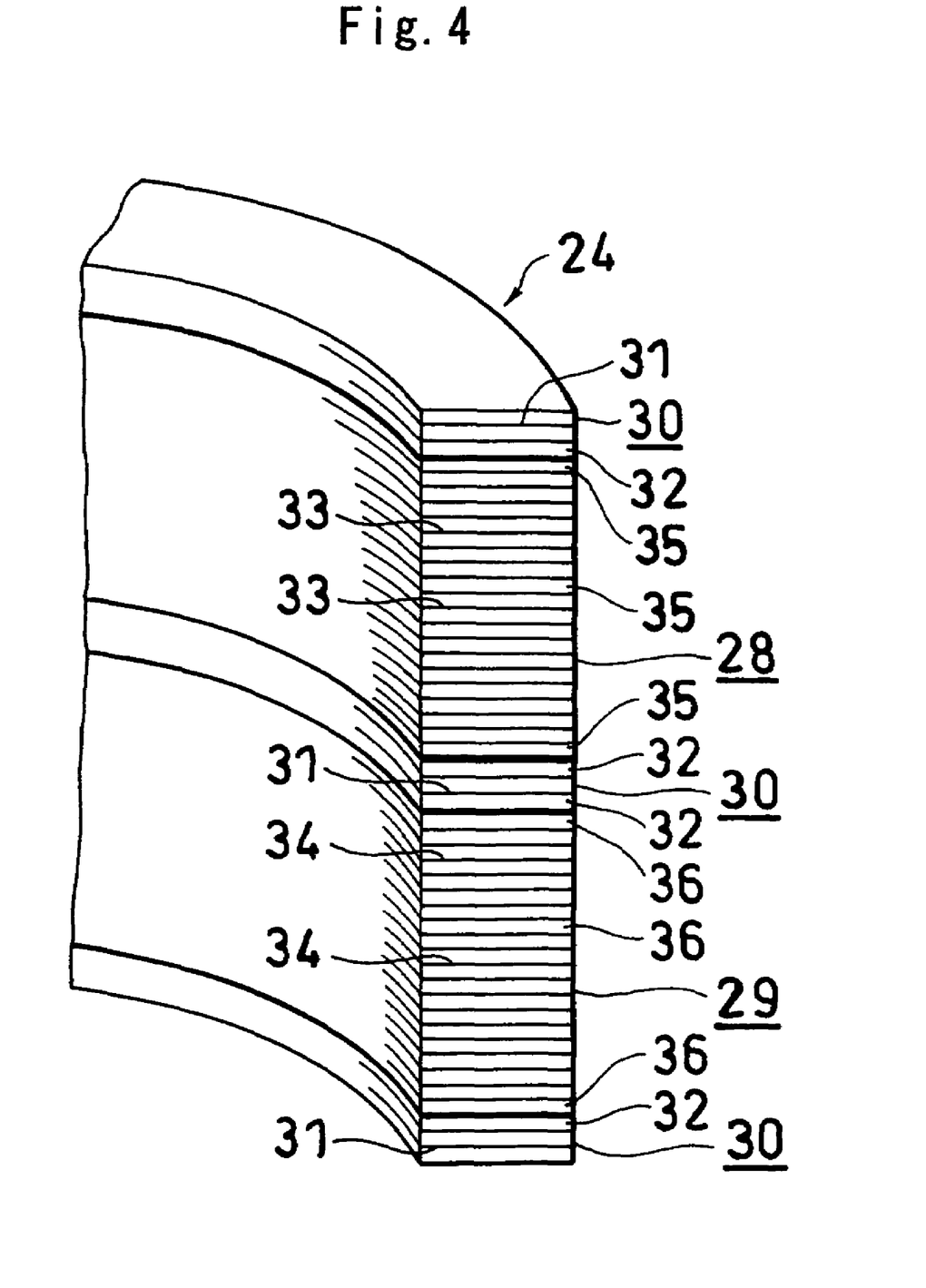
FIG. 4 is a fragmentary perspective view partly broken away and showing a rotatable bearing portion of FIG. 3.
Figure 5:
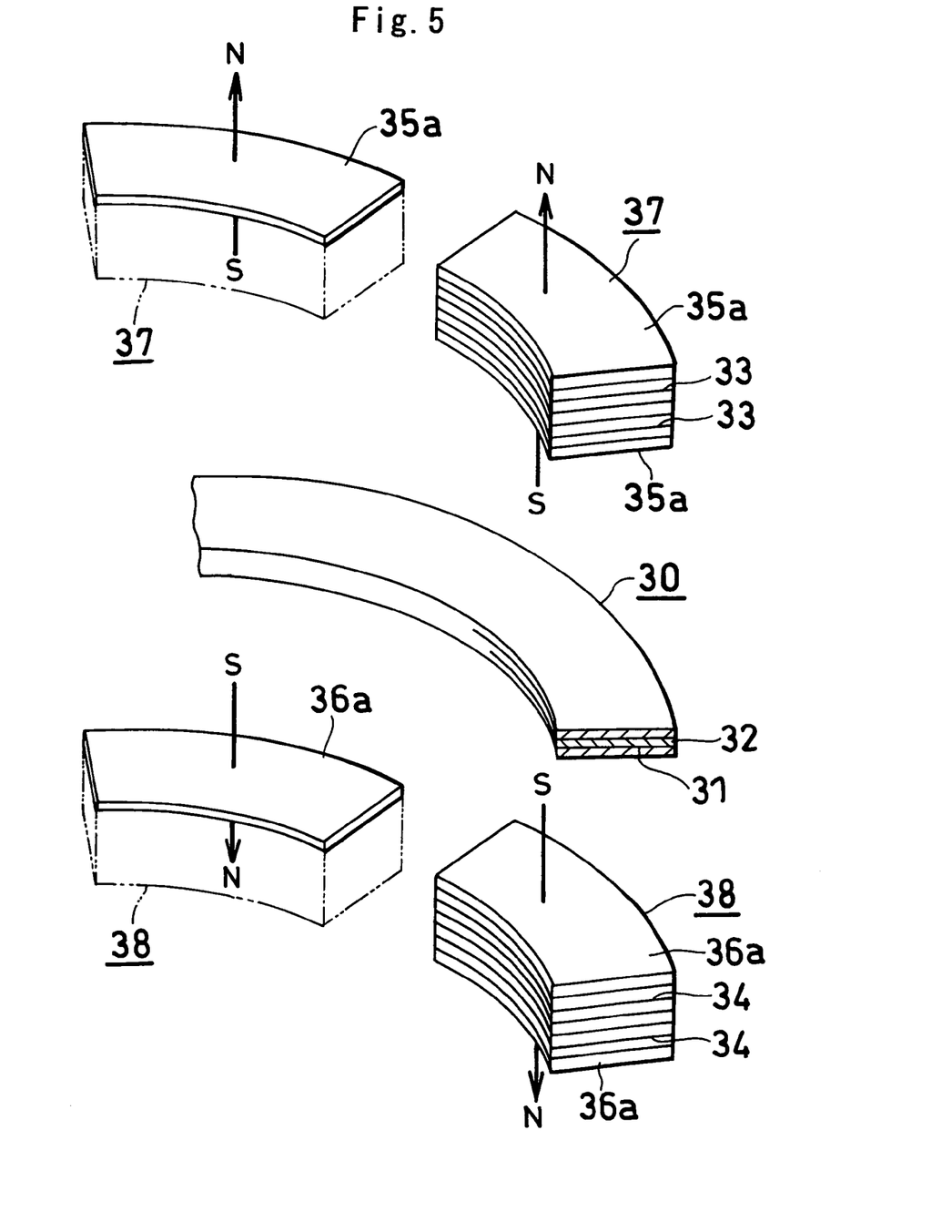
FIG. 5 is a fragmentary exploded perspective view partly broken away and showing the rotatable bearing portion of FIG. 3.

FIGS. 3 to 5 show a first embodiment.

FIG. 3 shows a superconductive magnetic bearing 22 of the radial type wherein a rotatable body 21 which is a portion rotatable relative to a stationary portion 20 is contactlessly supported. The superconductive magnetic bearing 22 comprises a stationary bearing portion 23 provided on the stationary portion 20, and a rotatable bearing portion 24 provided on the rotatable body 21.

The stationary portion 20 has an annular cooling tank 25 centered about a vertical axis of the stationary portion 20. The stationary bearing portion 23 is provided at an outer peripheral portion of the interior of the tank 25.

The stationary bearing portion 23 comprises a superconductor unit 26 in the form of a hollow cylinder and fixed concentrically to the outer peripheral portion of the interior of the tank 25. Although not shown in detail, the superconductor unit 26 comprises a plurality of circumferentially divided superconductive bulks 27. Each of superconductor bulks 27 comprises a superconductor of the second kind having fine normally conductive particles uniformly incorporated therein. According to the present embodiment, the superconductor bulks 27 comprise yttrium-base superconductor, i.e., yttrium 123 ($YBa_2Cu_3O_{7-x}$), having uniformly incorporated therein fine particles of a yttrium-base normal conductor, i.e., yttrium 211 ($Y_2BaCu$).

The tank 25 is connected to an unillustrated suitable cooling device by a cooling fluid supply pipe 46 and a cooling fluid discharge pipe 47. A cooling fluid comprising, for example, liquid nitrogen is circulated through the tank 25 by the cooling device, and the superconductor unit 26 is cooled by the cooling fluid filling the tank 25.

The rotatable body 21 comprises a vertical shaft portion 21a disposed above the stationary portion 20 concentrically therewith, a disk portion 21b fixed to the lower end of the shaft portion 21a concentrically therewith, and a hollow cylindrical support portion 21c fixed to the lower side of the disk portion 21b concentrically therewith. The rotatable bearing portion 24 is provided on the inner peripheral portion of the cylindrical portion 21c.

The rotatable bearing portion 24 comprises two hollow cylindrical permanent magnet units 28, 29 and three hollow cylindrical yokes 30 which are opposed to and positioned radially outwardly of the superconductor unit 26, and spaced therefrom by a small clearance. The two magnet units 28, 29 are arranged side by side axially of the unit 26 (in the upward or downward direction). The yokes 30 are arranged adjacent to the opposed lower and upper end faces of the upper and lower permanent magnet units 28, 29, to the upper end face of the upper magnet unit 28 and to the lower end face of the lower magnet unit 29. Each of the magnet units 28, 29 have magnetic poles at the upper and lower ends thereof, and the adjacent ends of the two magnet units 28, 29 have the same polarity. According to the present embodiment, the upper magnet unit 28 has an N pole at its upper end and an S pole at its lower end, and the lower magnet unit 29 has an S pole at its upper end and an N pole at its lower end.

The rotatable bearing portion 24 is shown in detail in FIGS. 4 and 5. FIG. 4 is a fragmentary perspective view partly broken away and showing the rotatable bearing portion 24. FIG. 5 is a fragmentary perspective view partly broken away and showing the bearing portion 24 as disassembled.

Each of the yokes 30 comprises a plurality of yoke members 32 made of a magnetic material, each in the form of a disk having a hole and arranged in superposed layers axially of the bearing with an insulating layer 31 provided between each adjacent pair of yoke members 32. Each of the yoke members 32 is an integral piece made, for example, of a silicon steel sheet and extending over the entire circumference. The yoke member 32 is provided with an insulating film formed over each of its upper and lower surfaces to provide the insulating layer 31.

Each permanent magnet unit 28 (29) comprises a plurality of permanent magnet members 35 (36) each in the form of a disk having a hole and arranged in superposed layers axially thereof with an insulating layer 33 (34) provided between each adjacent pair of magnet members 35 (36). Each of the magnet members 35 (36) is provided with an insulating film formed over each of its upper and lower surfaces to provide the insulating layer 33 (34).

Each of the permanent magnet members 35, 36 may be an integral piece extending over the entire circumferential direction or may comprise a plurality of divided circular-arc segments which are arranged in the circumferential direction. According to the present embodiment, the permanent magnet member 35 (36) comprises a plurality of circumferentially divided circular-arc segments 35a (36a).

With reference to FIG. 5, the upper permanent magnet unit 28 comprises a plurality of circumferentially divided segmental cylindrical blocks 37. Each of the blocks 37 comprises a plurality of circular-arc segments 35a arranged in superposed layers in the axial direction. Each circular-arc segment 35a is, for example, about 0.5 mm in thickness in the upward or downward direction. The circular-arc segment 35a has an insulating film formed over each of its upper and lower surfaces to provide the insulating layer 33. The circular-arc segment 35a has magnetic poles at the respective upper and lower surfaces thereof, i.e., an N pole at the upper surface and an S pole at the lower surface. When such circular-arc segments 35a are arranged in superposed layers, the block 37 has in its entirety an N pole at its upper end and an S pole at its lower end. The permanent magnet unit 28 is provided by arranging a plurality of blocks 37 in the circumferential direction between the upper and lower yokes 30.

The lower permanent magnet unit 29 also comprises a plurality of segmental cylindrical blocks 38 each comprising a plurality of circular-arc segments 36a arranged in superposed layers in the axial direction. In the case of the lower magnet unit 29, the circular-arc segment 36a has an S pole at the upper surface and an N pole at the lower surface, and the block 38 has in its entirety an S pole at its upper end and an N pole at its lower end. With the exception of these features, the lower magnet unit 29 is the same as the upper magnet unit 28.

With the superconductive magnetic bearing 22 described above, the magnetic fields set up by the permanent magnet units 28, 29 penetrate into the superconductor unit 26 when the unit is in the normal conducting state as in the environment of room temperature. When the superconductor unit 26 in this state is brought into a superconducting state by cooling, the magnetic fields penetrating into superconductor unit 26 are captured at the pinning points in the interior of the unit 26, and the rotatable bearing portion 24 is contactlessly supported relative to the stationary bearing portion 23 with respect to the axial and radial directions by virtue of this pinning effect.

Although the permanent magnet units 28, 29 are circumferentially divided into blocks 37, 38, the yokes 30 provided render the magnetic fields of the units 28, 29 substantially uniform with respect to the circumferential direction. Accordingly, even if the magnet units 28, 29 rotate with the rotatable body 21, the magnetic fields remain unaltered to produce no resistance to rotation. The magnetic fields which are circumferentially uniform are captured at the pinning points of the superconductor unit 26.

Since the superconductor unit 26 is circumferentially divided into a plurality of superconductor bulks 27, the magnetic fields set up by the unit 26 become circumferentially uneven as previously described, and when the rotatable bearing portion 24 rotates with the rotatable body 21, the permanent magnet units 28, 29 and the yokes 30 are subjected to changes in magnetic fields. However, because the permanent magnet units 28, 29 comprise permanent magnet members 35, 36 arranged in superposed layers along with intervening insulating layers 33, 34 and further because the yokes 30 also comprise yoke members 32 which are arranged in superposed layers along with insulating layers 31, the eddy currents to be produced in the magnet units 28, 29 and yokes 30 diminish to reduce the resulting rotational loss.

Figure 6:
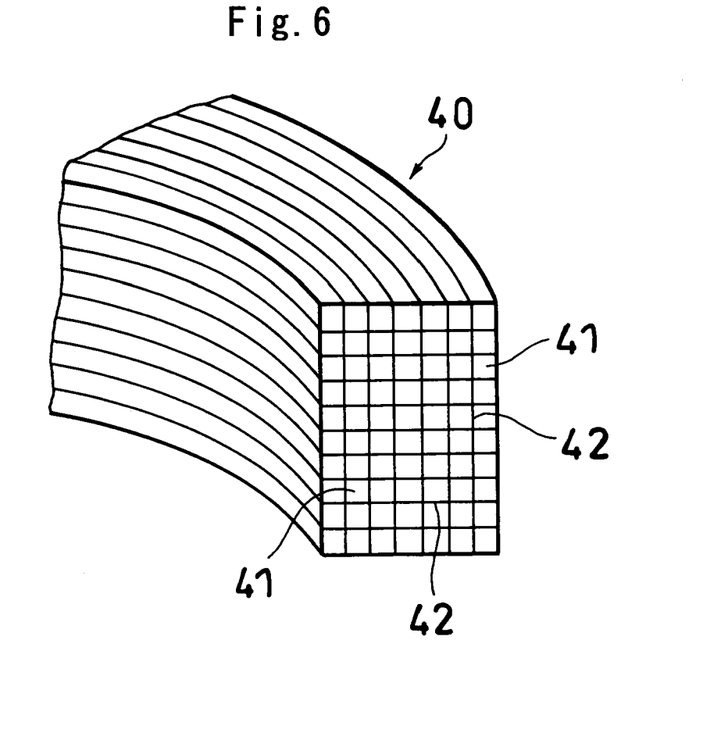
FIG. 6 is a fragmentary perspective view partly broken away and showing a modification of a permanent magnet unit included in the first embodiment.

FIG. 6 shows a modification of the permanent magnet unit of the first embodiment.

The permanent magnet unit 40 shown comprises a plurality of annular permanent magnet members 41 having a square or rectangular cross section and arranged in superposed layers in both the axial and radial directions with an insulating layer 42 interposed between each adjacent pair of magnet members.

Each permanent magnet member 41 in this case may be an integral piece extending over the entire circumferential direction or may comprise a plurality of circumferentially divided circular-arc segments.

Figure 7:
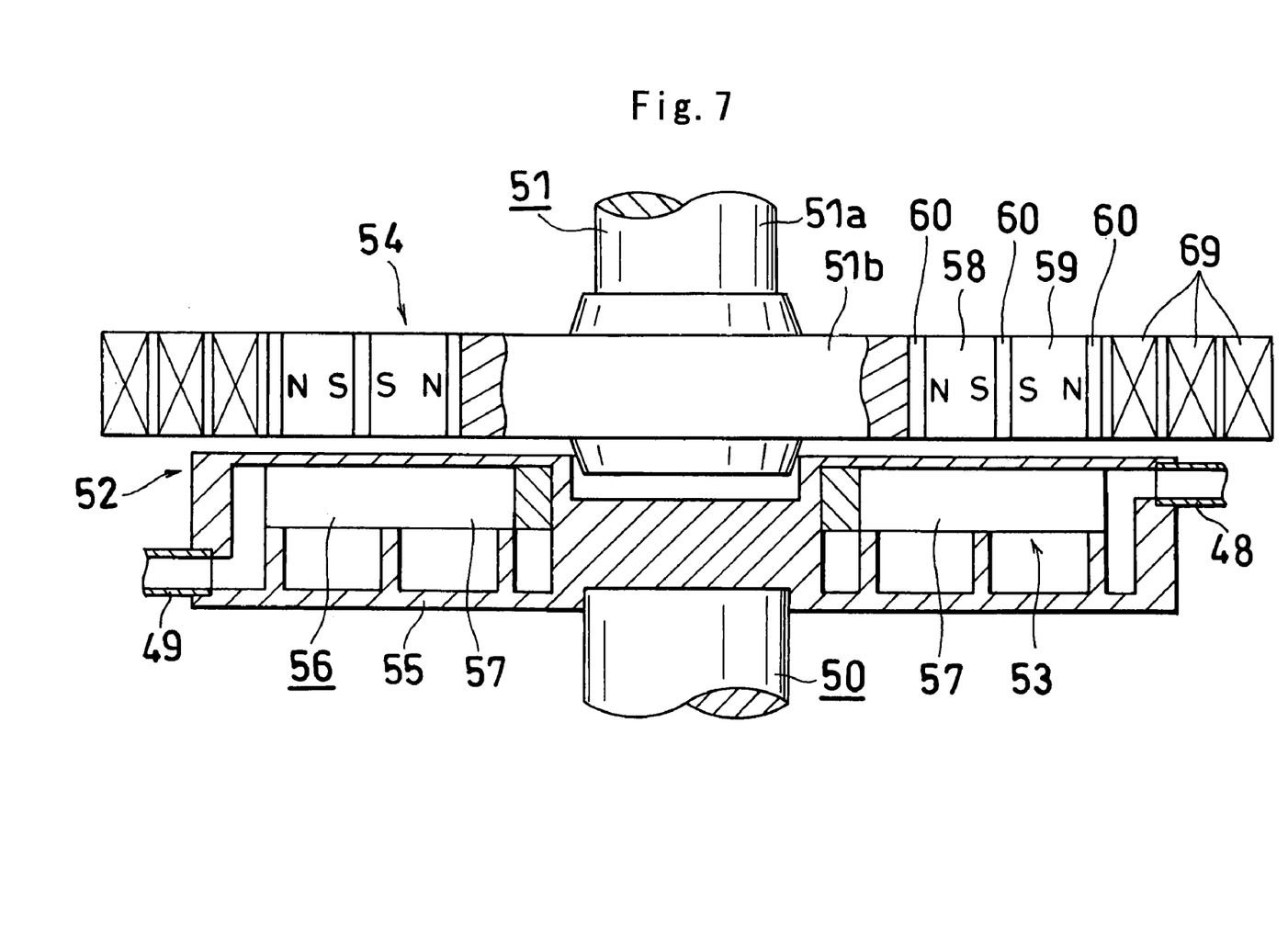
FIG. 7 is a view in vertical section of a superconductive magnetic bearing of the axial type to show a second embodiment of the invention.
Figure 8:
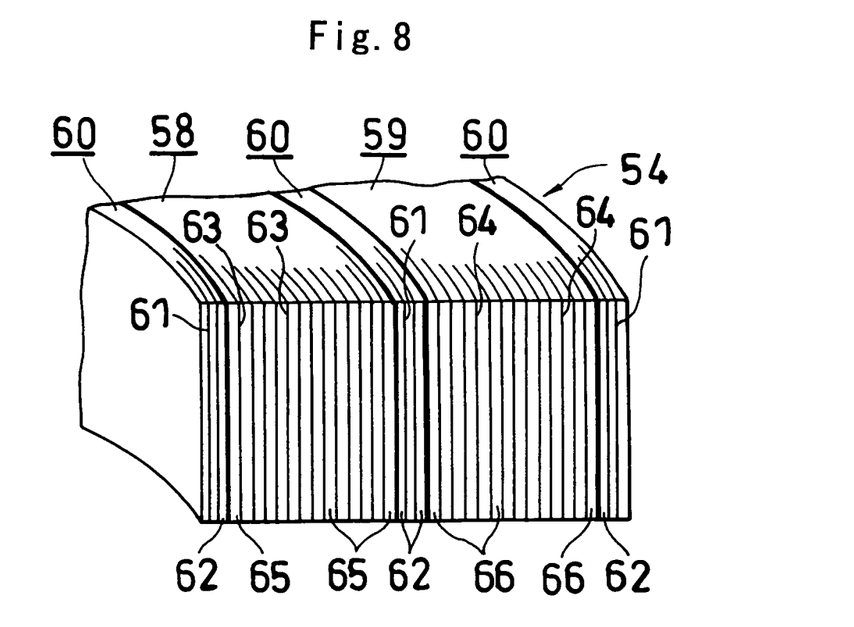
FIG. 8 is a fragmentary perspective view partly broken away and showing a rotatable bearing portion of FIG. 7.
Figure 9:
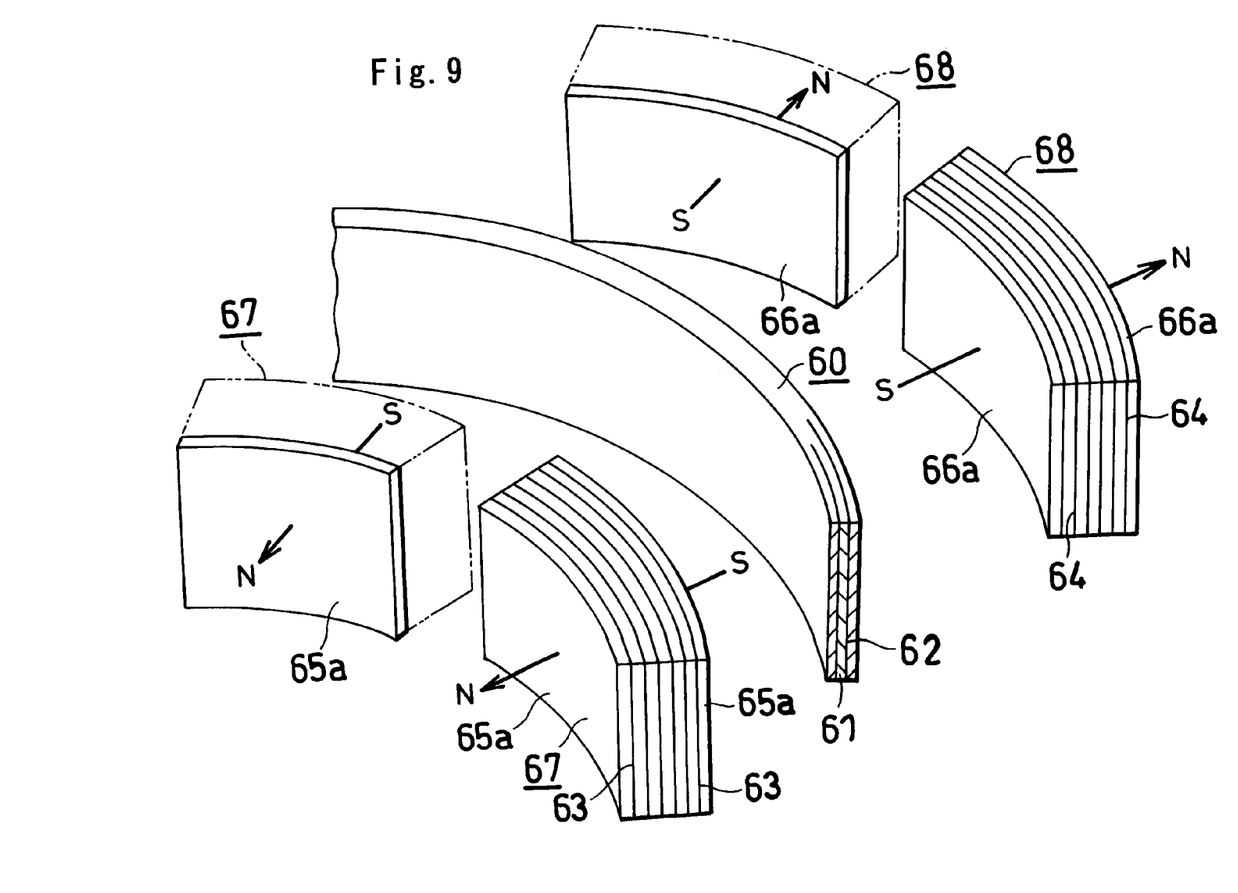
FIG. 9 is a fragmentary exploded perspective view partly broken away and showing the rotatable bearing portion of FIG. 7.

FIGS. 7 to 9 show a second embodiment.

FIG. 7 shows a superconductive magnetic bearing 52 of the axial type wherein a rotatable body 51 which is a portion rotatable relative to a stationary portion 50 is contactlessly supported. The superconductive magnetic bearing 52 comprises a stationary bearing portion 53 provided on the stationary portion 50, and a rotatable bearing portion 54 provided on the rotatable body 51.

The stationary portion 50 has a flat annular cooling tank 55 centered about a vertical axis of the stationary portion 50. The stationary bearing portion 53 is provided at an upper end portion of the interior of the tank 55.

The stationary bearing portion 53 comprises a superconductor unit 56 in the form of a relatively thick disk having a hole and fixed to the upper end portion within the tank 55 concentrically therewith. Although not shown in detail, the superconductor unit 56 comprises a plurality of circumferentially divided superconductor bulks 57. As in the case of the first embodiment, the superconductor bulks 57 comprise a superconductor of the second kind.

The tank 55 is connected to an unillustrated suitable cooling device by a cooling fluid supply pipe 48 and a cooling fluid discharge pipe 49 for cooling the superconductor unit 56 in the same manner as in the first embodiment.

The rotatable body 51 comprises a vertical shaft portion 51a disposed above the stationary portion 50 concentrically therewith, and a support disk portion 51b fixed to the lower end of the shaft portion 51a concentrically therewith. The rotatable bearing portion 54 is provided around the disk portion 51b.

The rotatable bearing portion 54 comprises two permanent magnet units 58, 59 and three yokes 60 which are arranged as opposed to the superconductor unit 56 on the axial upper side thereof and spaced from the unit 56 by a small clearance. The two magnet units 58, 59 are arranged radially of the rotatable body 51 concentrically therewith. The yokes 60 are arranged adjacent to the opposed outer and inner peripheries of the respective inner and outer magnet units 58, 59, to the inner periphery of the inner magnet unit 58 and to the outer periphery of the outer magnet unit 59. The magnet units 58, 59 have magnetic poles on the inner and outer peripheral surfaces thereof, and the adjacent peripheral surfaces of the two unit 58, 59 have the same polarity. With the present embodiment, the inner magnet unit 58 has an N pole on the inner peripheral surface thereof and an S pole on the outer peripheral surface thereof, and the outer magnet unit 59 has an S pole on the inner peripheral surface and an N pole on the outer peripheral surface.

The rotatable bearing portion 54 is shown in detail in FIGS. 8 and 9. FIG. 8 is a fragmentary perspective view partly broken away and showing the rotatable bearing portion 54, and FIG. 9 is a fragmentary perspective view partly broken away and showing the rotatable bearing portion 54 as disassembled.

Each of the yokes 60 comprises a plurality of yoke members 62 made of a magnetic material, each in the form of a hollow cylinder and arranged in superposed layers radially thereof with an insulating layer 61 provided between each adjacent pair of yoke members 62. Each of the yoke members 62 is an integral piece made, for example, of a silicon steel sheet and extending over the entire circumference. The yoke member 62 is provided with an insulating film formed over each of its inner and outer surfaces to provide the insulating layer 61.

Each permanent magnet unit 58 (59) comprises a plurality of permanent magnet members 65 (66) each in the form of a hollow cylinder and arranged in superposed layers radially thereof with an insulating layer 63 (64) provided between each adjacent pair of magnet members 65 (66). Each of the magnet members 65 (66) is provided with an insulating film formed over each of its inner and outer surfaces to provide the insulating layer 63 (64).

Each of the permanent magnet members 65, 66 may be an integral piece extending over the entire circumferential direction or may comprise a plurality of divided circular-arc segments which are arranged in the circumferential direction. According to the present embodiment, the permanent magnet member 65 (66) comprises a plurality of circumferentially divided circular-arc segments 65a (66a).

With reference to FIG. 9, the inner permanent magnet unit 58 comprises a plurality of circumferentially divided segmental cylindrical blocks 67. Each of the blocks 67 comprises a plurality of circular-arc segments 65a arranged in superposed layers in the radial direction. Each circular-arc segment 65a is, for example, about 0.5 mm in thickness in the inward or outward direction. The circular-arc segment 65a has an insulating film formed over each of its inner and outer surfaces to provide the insulating layer 63. The circular-arc segment 65a has magnetic poles on the respective inner and outer surfaces thereof, i.e., an N pole on the inner surface and an S pole at the outer surface. When such circular-arc segments 65a are arranged in superposed layers, the block 67 has in its entirety an N pole at its inner surface and an S pole at its outer surface. The permanent magnet unit 58 is provided by arranging a plurality of blocks 67 in the circumferential direction between the inner and outer yokes 60.

The outer permanent magnet unit 59 also comprises a plurality of segmental cylindrical blocks 68 each comprising a plurality of circular-arc segments 66a arranged in superposed layers in the radial direction. In the case of the outer magnet unit 59, the circular-arc segment 66a has an S pole at the inner surface and an N pole at the outer surface, and the block 68 has in its entirety an S pole at its inner end and an N pole at its outer end. With the exception of these features, the outer magnet unit 59 is the same as the inner magnet unit 58.

A plurality of annular reinforcing members 69 are provided around the rotatable bearing portion 54 concentrically therewith for preventing the expansion of the yoke members 62 and the permanent magnet members 65, 66 due to the centrifugal force produced by high-speed rotation and the resulting break of such members 62, 65, 66. The reinforcing members 69 are made, for example, from CFRP (carbon fiber reinforced plastics).

With the superconductive magnetic bearing 52 described above, the magnetic fields set up by the permanent magnet units 58, 59 penetrate into the superconductor unit 56 when the unit 56 is in the normal conducting state as in the environment of room temperature. When the superconductor unit 56 in this state is brought into a superconducting state by cooling, the magnetic fields penetrating into superconductor unit 56 are captured at the pinning points in the interior of the unit 56, and the rotatable bearing portion 54 is contactlessly supported relative to the stationary bearing portion 53 with respect to the axial and radial directions by virtue of this pinning effect.

Although the permanent magnet units 58, 59 are circumferentially divided into blocks 67, 68, the yokes 60 provided render the magnetic fields of the units 58, 59 substantially uniform with respect to the circumferential direction. Accordingly, even if the magnet units 58, 59 rotate with the rotatable body 51, the magnetic fields remain unaltered to produce no resistance to rotation. The magnetic fields which are circumferentially uniform are captured at the pinning points of the superconductor unit 56.

Since the superconductor unit 56 is circumferentially divided into a plurality of superconductor bulks 57, the magnetic fields set up by the unit 56 become circumferentially uneven as previously described, and when the rotatable bearing portion 54 rotates with the rotatable body 51, the permanent magnet units 58, 59 and the yokes 60 are subjected to changes in magnetic fields. However, because the permanent magnet units 58, 59 comprise permanent magnet members 65, 66 arranged in superposed layers along with intervening insulating layers 63, 64 and further because the yokes 60 also comprise yoke members 62 which are arranged in superposed layers along with insulating layers 61, the eddy currents to be produced in the magnet units 58, 59 and yokes 60 diminish to reduce the resulting rotation loss.

The permanent magnet unit 58, 59 of the second embodiment may comprise a plurality of annular permanent magnet members having a square or rectangular cross section and arranged in superposed layers in both the axial and radial directions with an insulating layer interposed between each adjacent pair of magnet members. Each permanent magnet member in this case may be an integral piece extending over the entire circumferential direction or may comprise a plurality of circumferentially divided circular-arc segments.

INDUSTRIAL APPLICABILITY

As described above, the invention provides a useful superconductive magnetic bearing for contactlessly supporting a rotatable portion relative to a stationary portion utilizing the pinning effect of a superconductor of the second kind. Eddy currents are diminished which are produced in permanent magnet units and yokes due to uneven magnetic fields to be set up by a superconductor unit to reduce the rotation loss.

The invention claimed is:

1. A superconductive magnetic bearing comprising:
   a stationary bearing portion having an annular superconductor unit provided on a fixed portion; and
   a rotatable bearing portion having an annular permanent magnet unit provided on a rotary portion so as to be opposed to the superconductor unit,
   wherein the superconductor unit includes a plurality of circumferentially divided superconductor bulks, the adjacent superconductor bulks coming into contact with each other without a gap to constitute the superconductor unit, and the rotary portion being contactlessly supported relative to the fixed portion by the pinning effect of a superconductor constituting the superconductor unit,
   wherein in order to reduce a rotation loss of the rotatable bearing portion due to unevenness of magnetic fields occurring by the construction that the superconductor unit includes the plurality of superconductor bulks circumferentially divided and that the adjacent superconductor bulks comes into contact with each other without a gap, the rotatable bearing portion includes the annular permanent magnet unit and an annular yoke adjacent to the permanent magnet unit and opposed to the superconductor unit,
   wherein the permanent magnet unit includes a plurality of permanent magnet members arranged in superposed layers with an insulating layer provided between each adjacent pair of magnet members,
   wherein the yoke includes a plurality of yoke members made of a magnetic material and arranged in superposed layers with an insulating layer interposed between each adjacent pair of yoke members, and
   wherein the insulating layers of the yoke members directly contact an entire area of a contact surface of each adjacent yoke member.

* * * * *